(12) United States Patent
Devillez et al.

(10) Patent No.: US 12,275,521 B2
(45) Date of Patent: Apr. 15, 2025

(54) DOUBLE-CURVED AIRCRAFT DOOR WITH OPTIMISED LOCKING MEANS

(71) Applicant: LATECOERE, Toulouse (FR)

(72) Inventors: Sébastien Devillez, Saint Jean (FR); Jean Francois Ducasse, Miradoux (FR)

(73) Assignee: LATECOERE, Toulouse (FR)

( * ) Notice: Subject to any disclaimer, the term of this patent is extended or adjusted under 35 U.S.C. 154(b) by 164 days.

(21) Appl. No.: 18/006,609

(22) PCT Filed: Jul. 28, 2021

(86) PCT No.: PCT/EP2021/071110
§ 371 (c)(1),
(2) Date: Jan. 24, 2023

(87) PCT Pub. No.: WO2022/023402
PCT Pub. Date: Feb. 3, 2022

(65) Prior Publication Data
US 2023/0264803 A1    Aug. 24, 2023

(30) Foreign Application Priority Data

Jul. 31, 2020 (FR) ...................................... 2008210

(51) Int. Cl.
*B64C 1/14*        (2006.01)
(52) U.S. Cl.
CPC .................. *B64C 1/1423* (2013.01)

(58) Field of Classification Search
CPC ........ B64C 1/407; B64C 1/1423; B64C 1/143
See application file for complete search history.

(56) References Cited

U.S. PATENT DOCUMENTS 10,301,005 B2 * 5/2019 Werthmann ............ B64C 1/143

FOREIGN PATENT DOCUMENTS

| DE | 102008043023 | 7/2010 |
|----|--------------|--------|
| FR | 2550754      | 2/1985 |
| GB | 2042060      | 9/1980 |

* cited by examiner

*Primary Examiner* — Richard Green
*Assistant Examiner* — Nevena Aleksic
(74) *Attorney, Agent, or Firm* — Defillo & Associates, Inc.; Evelyn A. Defillo

(57) ABSTRACT

Double-curved aircraft door having a pair of stops in contact over a contact area. The isobarycentre (31A) of each contact area of a first lateral edge is substantially arranged in a first plane perpendicular to the longitudinal axis (21) and the same applies to a second lateral edge. For each contact area, the normal to the contact area passing through its isobarycentre (31A, 31B) substantially passes through the axis (41) of a medium cylinder (42). For each contact area, the normal to the contact area passing through its isobarycentre (31A, 31B) forms a deflection angle with a plane perpendicular to the longitudinal axis (21), the deflection angles of all the contact areas being equal.

16 Claims, 10 Drawing Sheets

DOUBLE-CURVED AIRCRAFT DOOR WITH OPTIMISED LOCKING MEANS

CROSS REFERENCE TO RELATED APPLICATION

This application is a national stage entry of PCT/EP2021/071110 filed Jul. 28, 2021, under the International Convention and claiming priority over French Patent Application No. FR2008210 filed Jul. 31, 2020.

TECHNICAL FIELD

The invention concerns the field of aeronautics and is more particularly directed to a double-curved aircraft door including locking means particularly well suited to this configuration.

Double-curved aircraft doors are intended to be integrated into the fuselage of an aircraft and more particularly portions of the latter that have curvatures in more than one direction. These aircraft doors may for example have a first curvature about a horizontal axis (corresponding to the generally cylindrical shape of the fuselage of aircraft) and a second curvature about a vertical and/or horizontal axis. These aircraft doors are specifically intended to be integrated into the portions of an aircraft having complex shapes due to different variations of curvatures.

Double-curved aircraft doors enable openings to be used even in difficult areas such as the nose or tail areas of an aircraft.

However, the locking means of double-curved aircraft doors are more complex than those of single-curved doors and necessitate adaptations for the door to withstand pressure properly when the aircraft is in flight with its cabin pressurized.

PRIOR ART

Double-curved aircraft doors at present in service generally include:

a leaf and a frame, the leaf being articulated relative to the frame;

locking means including leaf stops and frame stops, each leaf stop being positioned against a corresponding frame stop when the aircraft door is in its locked configuration, each leaf stop and its corresponding frame stop forming a pair of complementary stops that include bearing surfaces and are in contact in an area of contact when the aircraft door is in its locked configuration, said pairs of complementary stops being arranged on a first lateral edge and on a second lateral edge of the door, the corresponding areas of contact being arranged in at least two sets: a first set of areas of contact of the first lateral edge and a second set of areas of contact of the second lateral edge.

These prior art double-curved aircraft doors transmit the force caused by pressurization to which they are subjected via stops fixed to the leaf that bear on complementary stops fixed to the frame.

These aircraft doors are provided with a mechanism to enable placement of each stop face-to-face with its complementary stop on locking the door. This is for example a mechanism allowing a movement of raising or of lowering the leaf, or a mobile stop mechanism.

At present there exist three common architecture types for double-curved aircraft doors where the arrangement of the locking means is concerned.

In a first prior art architecture illustrated in FIGS. 1 and 2 the locking means are arranged so that the resultants of the reaction forces to the pressure exerted on the door are parallel to the pressure resultant.

In FIG. 1 the prior art aircraft door is seen in section from above and is intended for an aircraft extending along a longitudinal axis 10. The door includes an exterior panel 1 generally called the "skin", a door structure 2 to which leaf stops 3 are fixed, and a frame 4 to which frames stops 5 are fixed. In the sectional views in FIGS. 1 and 2 the prior art aircraft door is represented in a locked configuration with each leaf stop 3 disposed against a complementary frame stop 5.

When the cabin of the aircraft is pressurized, this prior art door is subjected to forces on respective opposite sides of the exterior panel 1 the origin of which is the pressure difference between the interior and the exterior of the cabin.

The vector 6 illustrates the pressure resultant, which is the total force exerted on the door because of pressurization.

Each leaf stop 3 and its frame stop 5 are in contact in an area of contact the shape and the orientation of which, in the plane of contact 9, determine the direction of the reaction force (vector 8) that each frame stop 5 exerts on the leaf stop 3.

In this first prior art architecture the shapes and the disposition of the stops 3, 5 are chosen so that the reaction forces exerted by the frame stops 5 are all parallel to the direction of the vector 6 of the pressure resultant.

FIG. 2 shows the vectors 8 of the reaction force parallel to the pressure resultant. To achieve this geometry the pairs of stops 3, 5 are all different, each having a plane of contact differently oriented relative to the body of each stop as a function of the position of the pair of stops 3, 5 on the door and the fuselage.

This type of architecture therefore necessitates the design and manufacture of numerous specific parts relating to the stops, specific to each locking location of the door. The production of an aircraft door with this first prior art architecture leads to production complexities and associated additional costs. The stops obtained are optimized from the point of view of mass and mechanical strength, but are all different and give rise, in addition to the high production cost, to higher part unit costs, as well as additional maintenance costs because of the numerous designs of stop to be stored as spares.

FIGS. 3 and 4 illustrate a second prior art double-curved aircraft door architecture. Elements similar to the first architecture described above bear the same reference numbers used in the figures.

In this second prior art architecture the locking means are arranged so that the reaction vector 8 of each frame stop 5 is:

contained in a plane 11 perpendicular to the longitudinal axis 10;

perpendicular to the tangent to the exterior panel 1 or to an appropriate surface near the exterior panel 1.

Thus, at the bottom of FIG. 4 one of the vectors 8 is illustrated with the corresponding tangent 12 to the exterior panel, the angle 13 therefore being a right-angle.

In this second prior art architecture all the leaf stops 3 and all the frame stops 5 of the first lateral edge 14 of the door are identical. The same applies to all the stops 3, 5 of the second lateral edge 15 of the door, which are identical.

This kind of aircraft door therefore necessitates only two designs of leaf stop 3 and two designs of frame stop 5.

However, the difference in orientation between the vector 6 of the pressure resultant and the reaction vector 8 of each frame stop 5 generates a force tending to move the leaf of the door in a lateral direction (toward the left in the example illustrated in FIG. 3). This undesirable force necessitates the addition of additional axial stops 16 to retain the door.

This second prior art architecture therefore necessitates additional parts for the additional axial stops 16 and leads to increased complexity of the locking means, resulting in increased setting times during production and maintenance of the door. Moreover, local reinforcements of the door and frame structures are also required at the level of the additional axial stops 16, a consequence of which is an increase in the mass of the aircraft and an increase in the production cost.

These additional stops also give rise to an additional risk of the door jamming in the event of an accident to the aircraft in that a proximity zone is created between the leaf and the frame, which imposes the use of elastic elements limiting the contact forces.

FIGS. 5 and 6 illustrate a third prior art double-curved aircraft door architecture. Elements similar to the previous prior art architectures described above bear the same reference numbers used in the figures.

In this third prior art architecture the reaction vector 8 of each frame stop 5 is:
  contained in a vertical plane 17 that is parallel to the vector 6 of the pressure resultant;
  perpendicular to the tangent to the exterior panel 1 or to an appropriate surface near this exterior panel 1.

At the bottom of FIG. 6 one of the vectors 8 is illustrated with the tangent 12 to the corresponding exterior panel, the angle 13 therefore being a right-angle.

As in the previous architecture, this third prior art architecture uses leaf stops 3 and frame stops 5 that are all identical on the first lateral edge 14, on the one hand, and on the second lateral edge 15, on the other hand. Additional axial stops 16 are no longer necessary.

However, the structure of the fuselage of the aircraft generally consists of frames extending in planes perpendicular to the longitudinal axis 10 of the aircraft. With this third prior art architecture the door frame 4 is made up of frame segments that are not aligned with the frames of the structure of the fuselage of the aircraft. This implies complex junctions between the fuselage of the aircraft and the door frame 4, with degraded structural force paths. The ensuing defects are in particular the necessity for local reinforcement to obtain the required mechanical strength (which leads to an increase in the mass of the aircraft), the necessity to increase the raw thickness of the door frame 4 and/or of the frames of the structure of the aircraft, which leads to an increase in machining times, and an assembly that is locally more complex at the level of the door frame 4. There is a negative impact on the mass and the production cost of an aircraft.

Moreover, if these disadvantages might be considered acceptable for some metal aircraft doors, they are in contrast out of the question in the case of composite material aircraft door frames and fuselage structures.

SUMMARY OF INVENTION

The invention has for object improving on the prior art aircraft doors.

To this end the invention is directed to a double-curved aircraft door intended for an aircraft that extends along a longitudinal axis, this aircraft door having at least one locked configuration and one open configuration, this aircraft door including:

a leaf and a frame, the leaf being articulated relative to the frame;

locking means including leaf stops and frame stops, each leaf stop being positioned against a corresponding frame stop when the aircraft door is in its locked configuration, each leaf stop and its corresponding frame stop forming a pair of complementary stops that include bearing surfaces that are in contact in an area of contact when the aircraft door is in its locked configuration, said pairs of complementary stops being arranged on a first lateral edge and on a second lateral edge of the aircraft door, the corresponding areas of contact being arranged in at least two sets: a first set of contact areas of the first lateral edge and a second set of contact areas of the second lateral edge.

In this aircraft door:
  the isobarycenter of each contact area of the first lateral edge is disposed substantially in a first plane perpendicular to said longitudinal axis;
  the isobarycenter of each contact area of the second lateral edge is disposed substantially in a second plane perpendicular to said longitudinal axis;
  for each contact area the normal to the contact area passing through its isobarycenter passes substantially through the axis of the mean cylinder, the mean cylinder being defined as the circular base cylinder the axis of which is parallel to said longitudinal axis and the radius of which satisfies the following condition: the sum of the distances between the isobarycenter of each contact area of the first lateral edge and the mean cylinder is substantially equal to the sum of the distances between the isobarycenter of each contact area of the second lateral edge and the mean cylinder;
  for each contact area the normal to the contact area passing through its isobarycenter forms a deviation angle with a plane perpendicular to said longitudinal axis, the deviation angles of all the contact areas being equal.

The aircraft door according to the invention benefits from optimized strength at the level of its leaf stops and its frame stops, related to the double-curvature employed. This optimization is obtained with a single leaf stop design and a single frame stop design for each of the lateral edges of the door.

The unit cost of the stops is therefore reduced because of production on a larger scale. A certain level of standardization can thus be implemented and the number of stop designs is reduced, which optimizes the operations of procuring, producing and storing spares.

No parasitic force caused by the pressurization of the cabin of the aircraft is exerted on the door, and in particular no lateral force. Thus, no additional stop is required for this aircraft door, which makes it possible to maintain an acceptable mass and a controlled cost of production. Adjustment of the door is simplified compared to doors including additional stops, which leads to a saving in time and cost for production, assembly, and maintenance.

Moreover, the aircraft door may be fitted into an aircraft by establishing direct correspondence between the door frame and the structure of the aircraft fuselage. The aircraft structure may even extend as far as the contour of the door and itself constitute the door frame. This arrangement has advantages relating to optimization of the thickness of the raw material of the door frame, with a corresponding reduction of machining time and therefore a saving in the cost of production.

At the level of the door frame structural forces stemming from the fuselage are transmitted smoothly, which limits local reinforcements and makes it possible to optimize the overall mass of the aircraft.

The aircraft door according to the invention may have the following additional features, separately or in combination:

the isobarycenter of each contact area of the first lateral edge is also disposed substantially on a first surface parallel to the exterior surface of the leaf;

the isobarycenter of each contact area of the second lateral edge is also disposed substantially on a second surface parallel to the exterior surface of the leaf;

the axis of the mean cylinder and the pressure resultant direction intersect, the pressure resultant direction being defined as the direction of the resultant force applied to the leaf of the aircraft door when it is subjected to a pressure;

the deviation angle is equal to the angle formed between the pressure resultant direction and a plane perpendicular to said longitudinal axis, the pressure resultant direction being defined as the direction of the resultant force applied to the leaf of the aircraft door when it is subjected to a pressure;

the frame stops of the first lateral edge are identical;

the frame stops of the second lateral edge are identical;

the leaf stops of the first lateral edge are identical;

the leaf stops of the second lateral edge are identical the contact areas extend in a contact plane oriented angularly on the corresponding stop in at least one direction;

the contact areas have a plane rectangular or plane circular shape;

the first surface parallel to the exterior surface of the leaf is spaced by a constant first distance from the exterior surface of the leaf;

the second surface parallel to the exterior surface of the leaf is spaced by a constant second distance from the exterior surface of the leaf;

the first constant distance and the second constant distance are different;

the first constant distance and the second constant distance are substantially equal;

the door includes an opening mechanism and further includes a supplementary set of stops defining contact areas the normal to which passing through their isobarycenter is at a distance from the axis of the mean cylinder on a side corresponding to opposition to the kinematic of the opening mechanism.

In accordance with another object, the invention is directed to an aircraft equipped with a double-curved door such as that described hereinabove.

BRIEF DESCRIPTION OF THE FIGURES

Other features and advantages of the invention will emerge from the following non-limiting description with reference to the appended drawings, in which.

In these various views the vectors representing forces are merely illustrative and in particular are not to scale relative to one another.

DETAILED DESCRIPTION OF THE INVENTION

Figure 1:
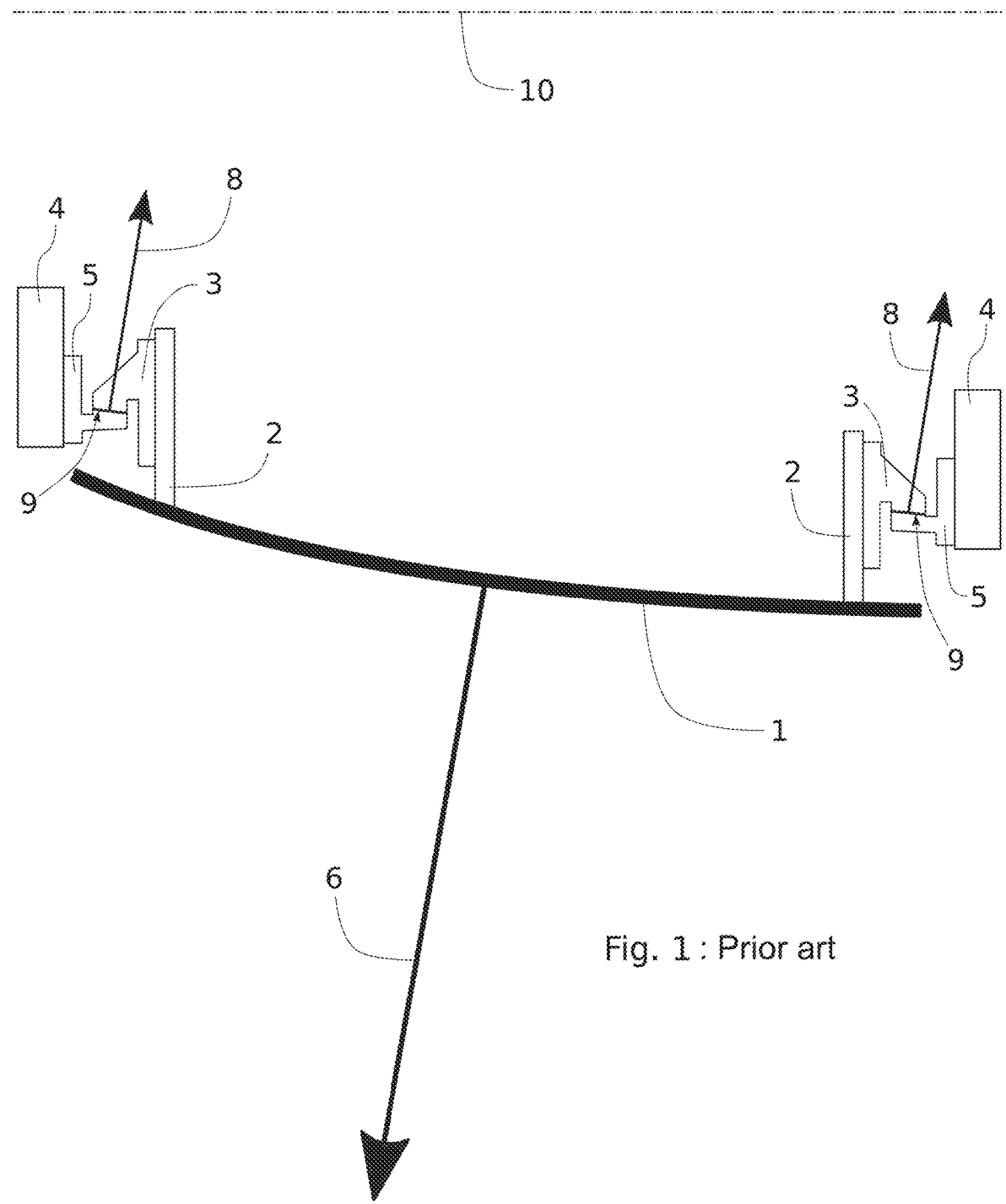
FIG. 1 illustrates a prior art aircraft door with a first architecture as seen from above and in section.
Figure 2:
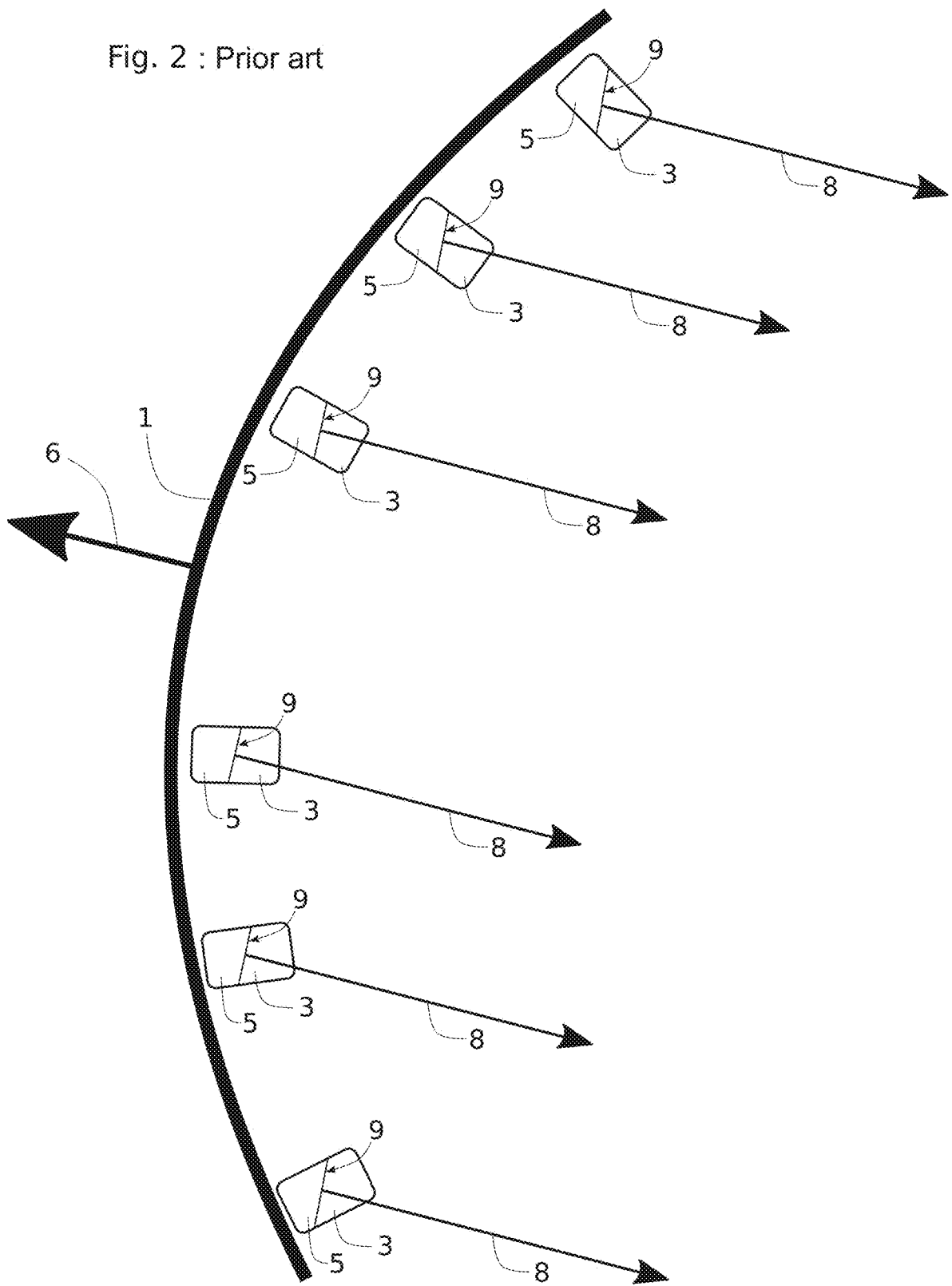
FIG. 2 illustrates the aircraft door from FIG. 1 as seen from the side.
Figure 3:
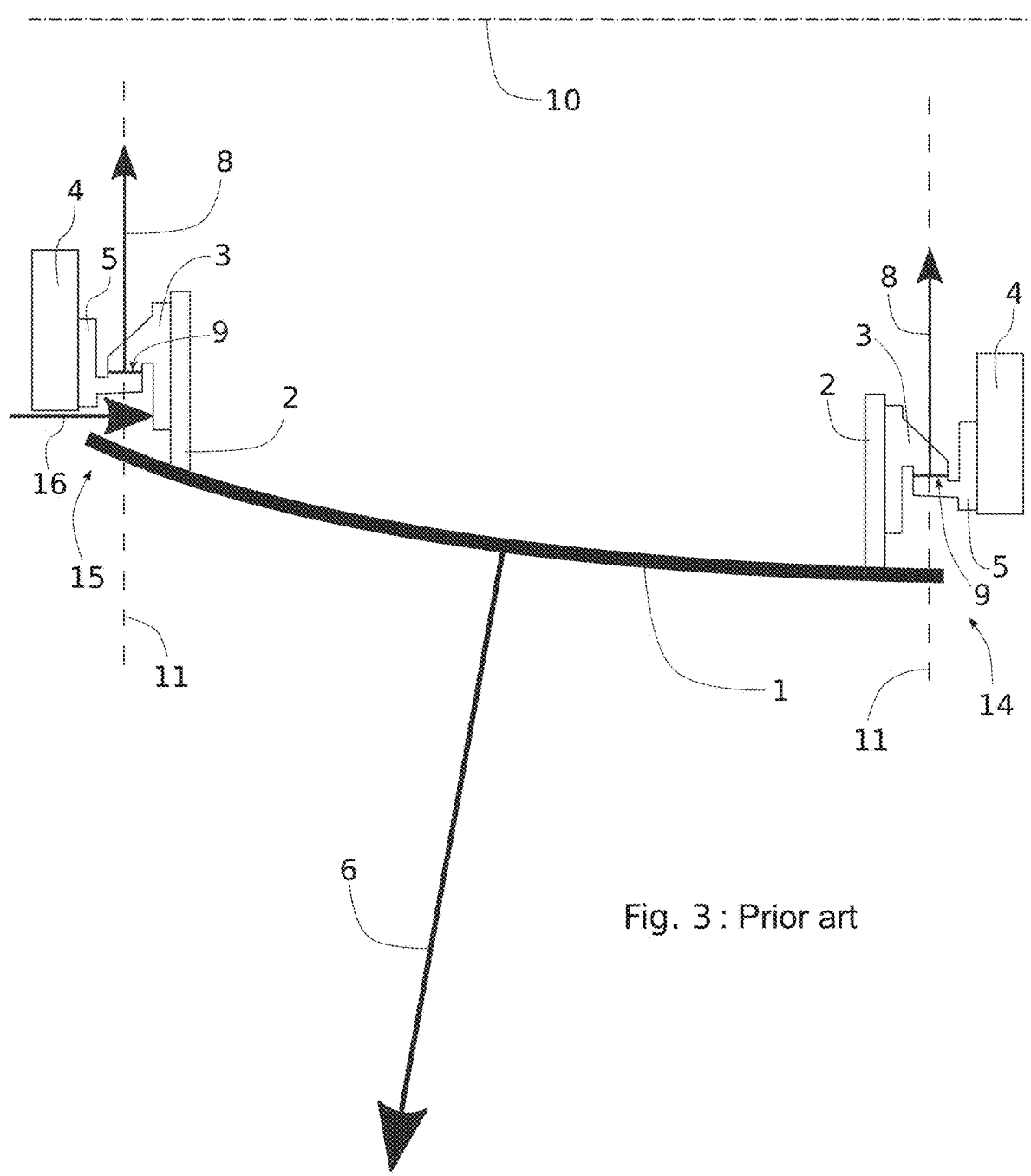
FIG. 3 illustrates a prior art aircraft door with a second architecture as seen from above and in section.
Figure 4:
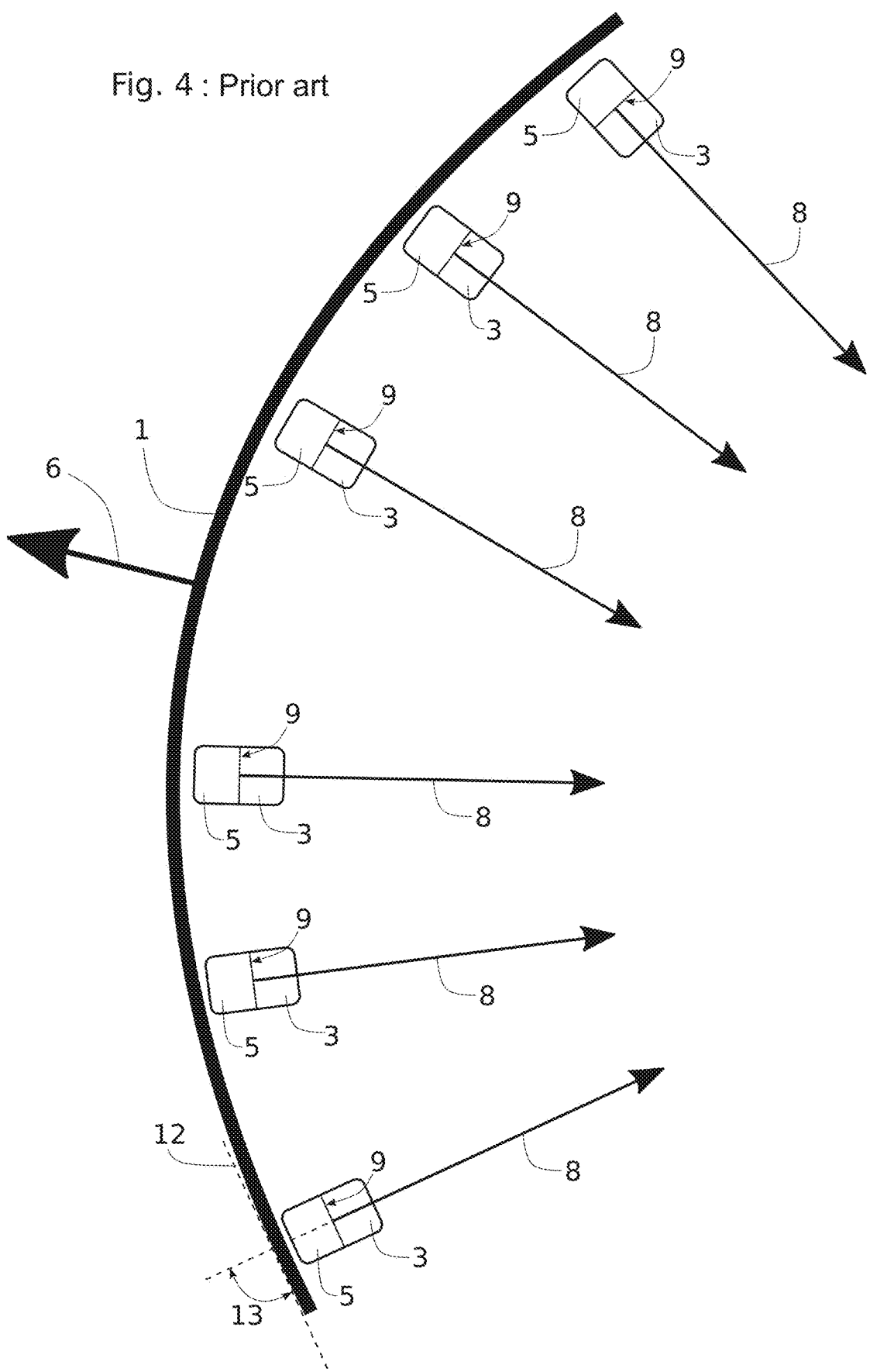
FIG. 4 illustrates the aircraft door from FIG. 3 as seen from the side.
Figure 5:
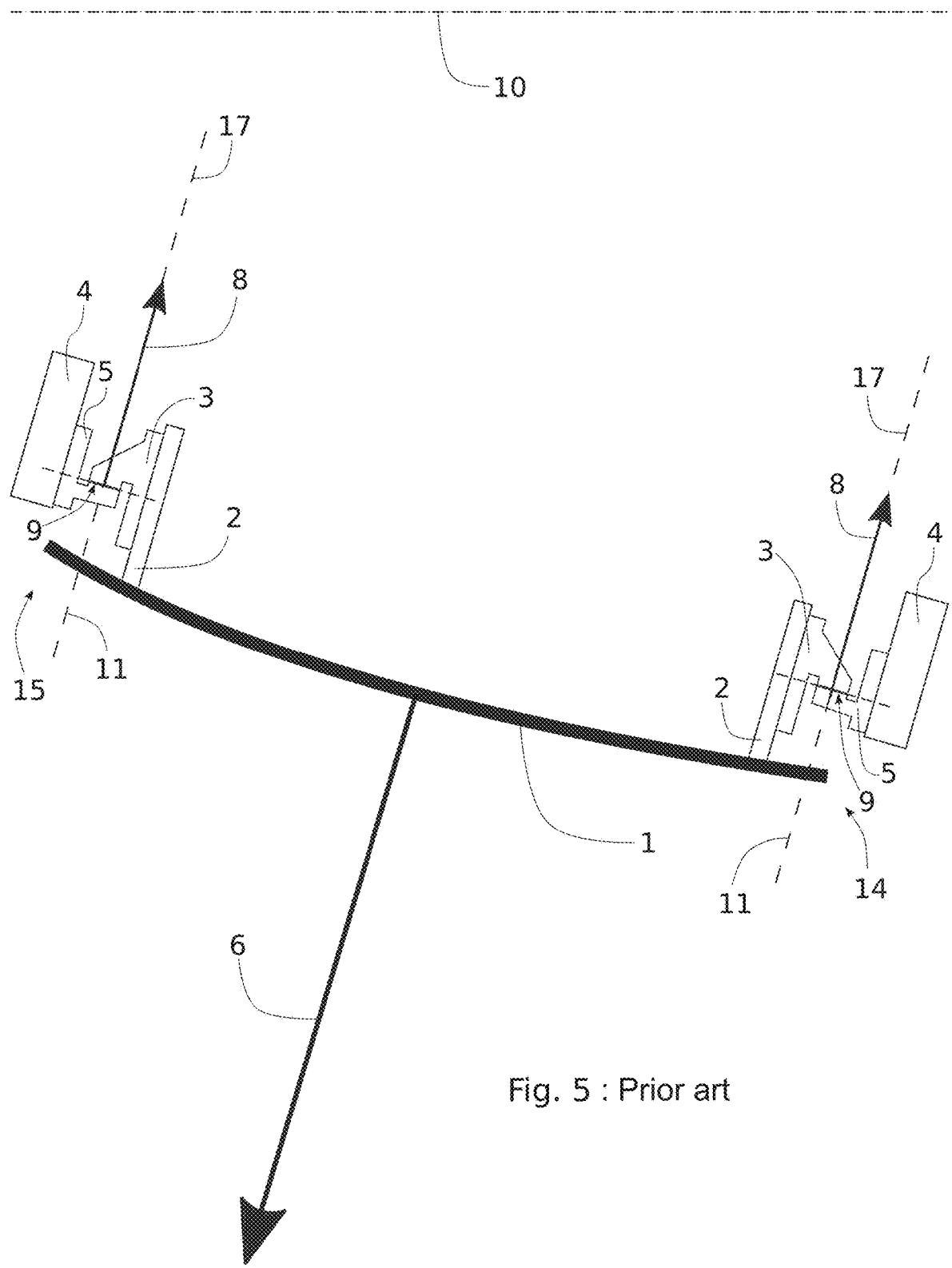
FIG. 5 illustrates a prior art aircraft door with a third architecture as seen from above and in section.
Figure 6:
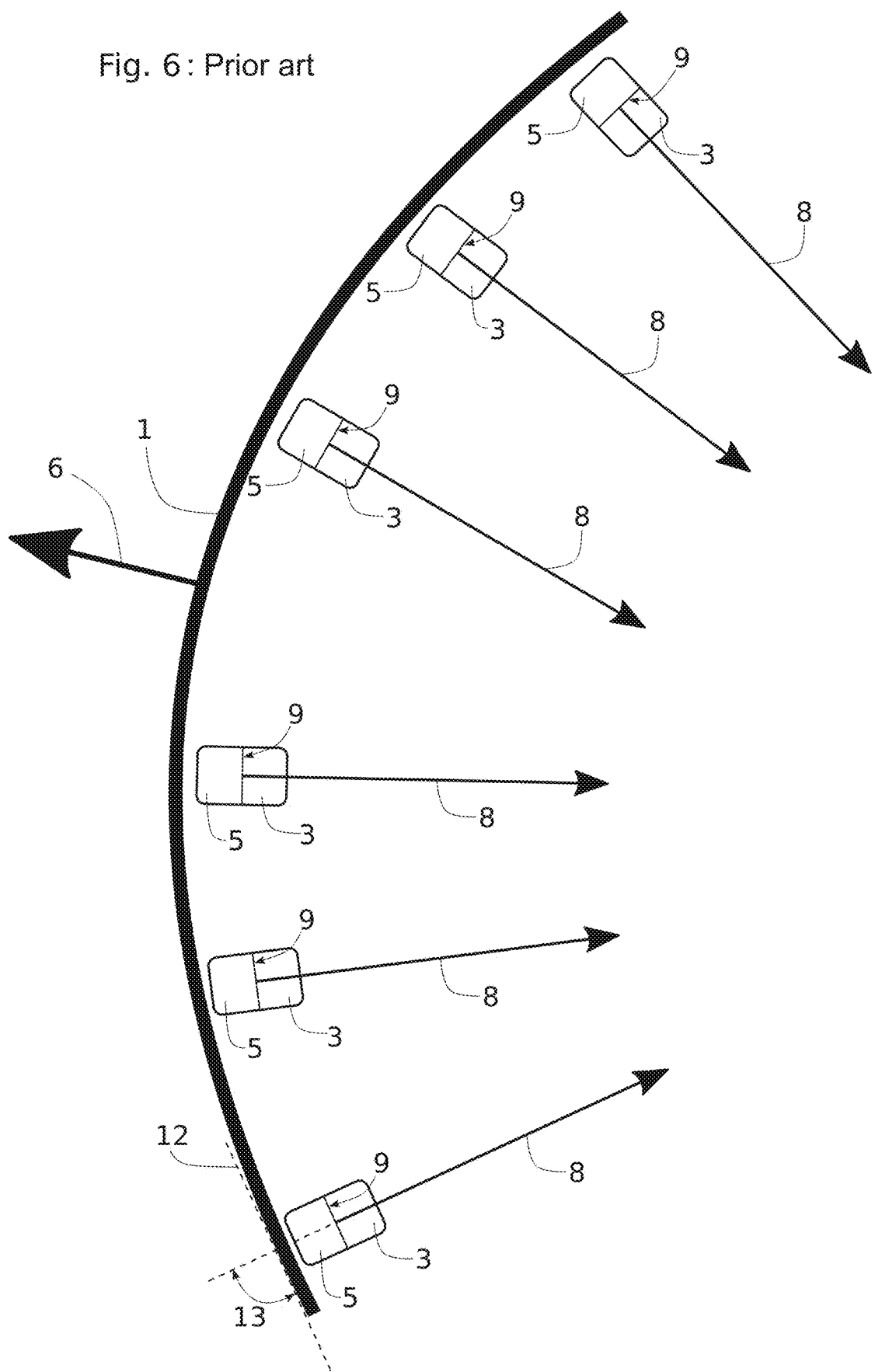
FIG. 6 illustrates the aircraft door from FIG. 5 as seen from the side.
Figure 7:
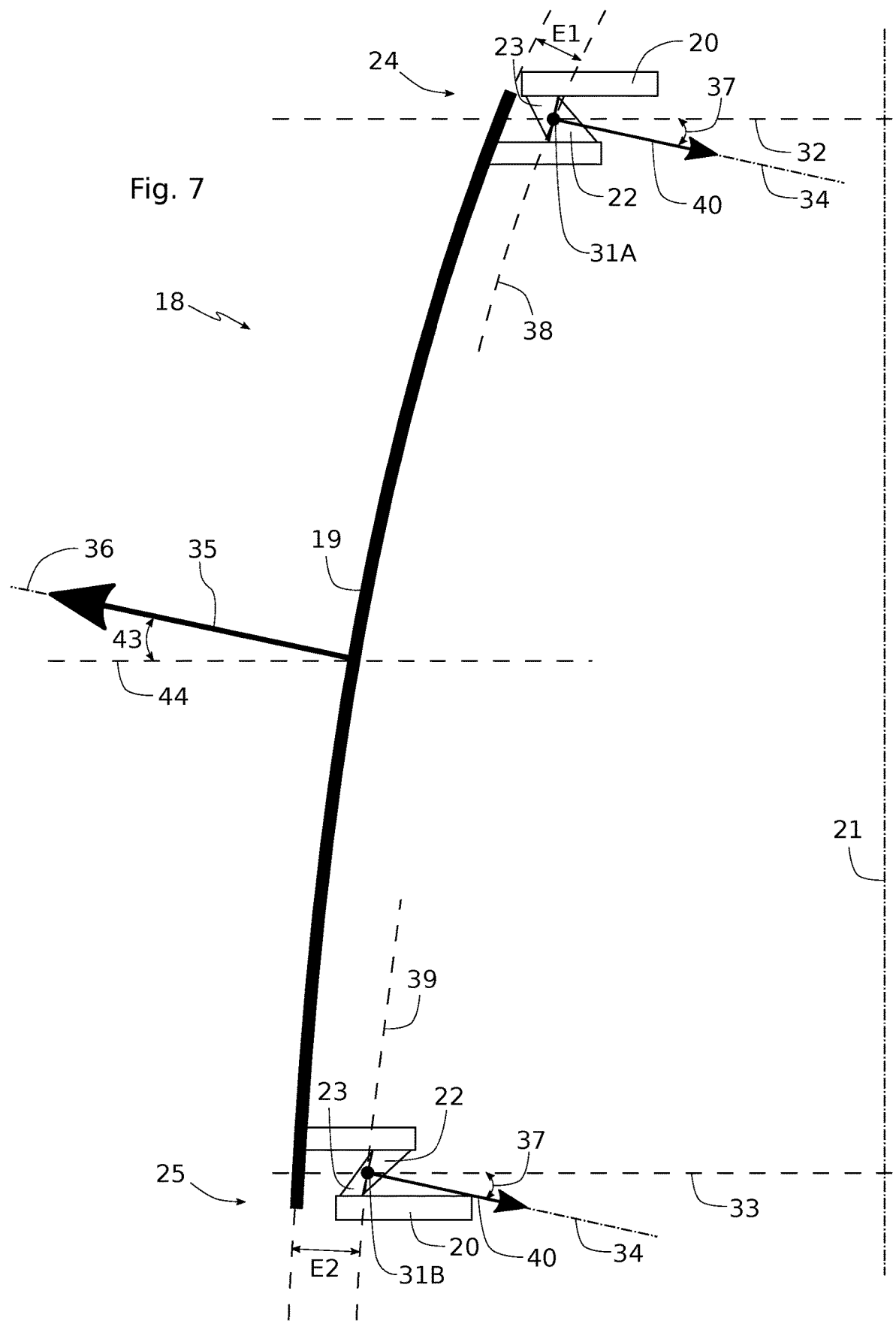
FIG. 7 illustrates an aircraft door according to the invention as seen from above.
Figure 8:
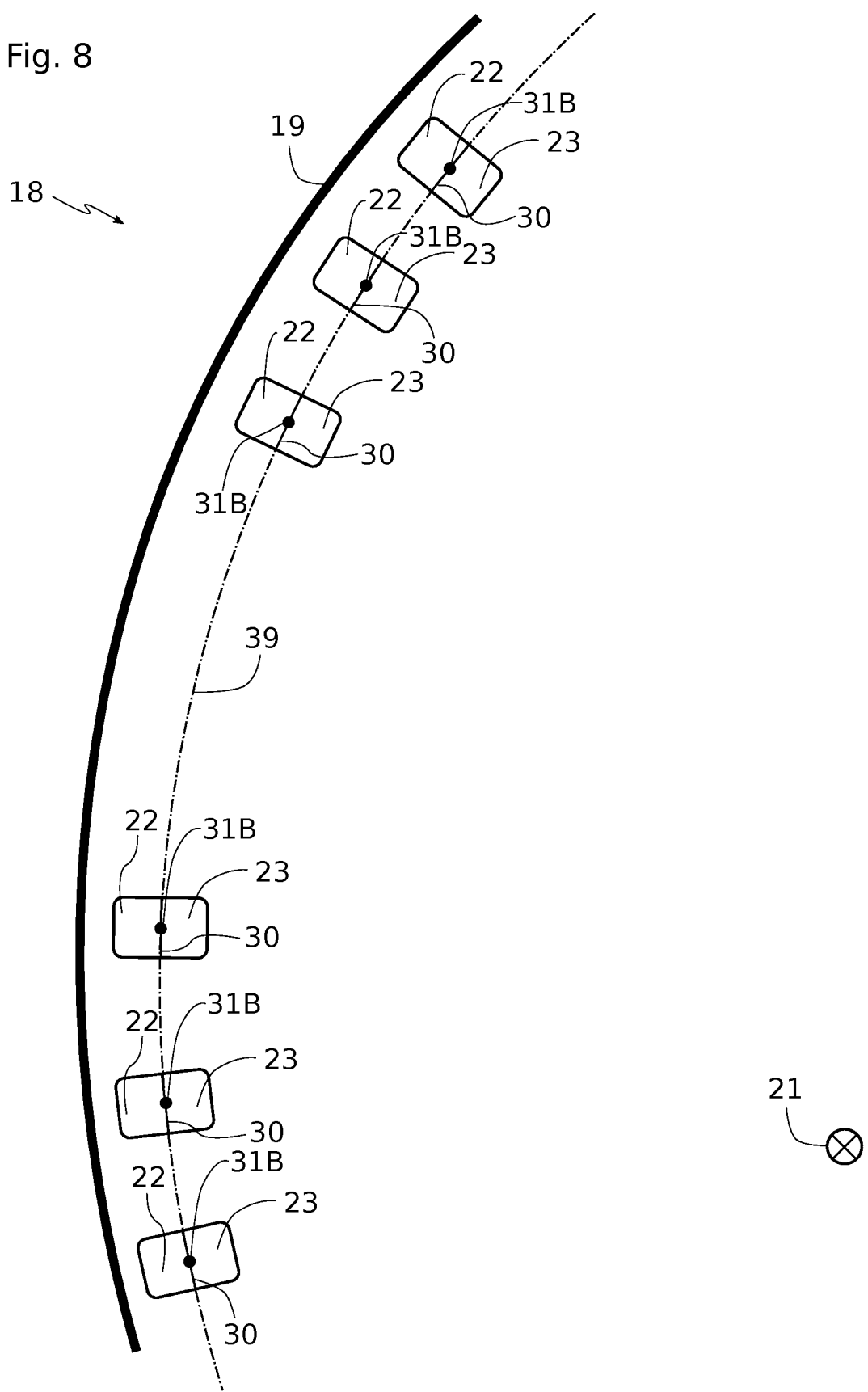
FIG. 8 illustrates the aircraft door from FIG. 7 as seen from the side.

FIGS. 7 and 8 illustrate a double-curved aircraft door 18 that comprises a frame 20 and a leaf 19 (as seen from above and in section in FIG. 7 and as seen from the side in FIG. 8).

The leaf 19 is mobile relative to the frame 20 thanks to a classic opening and closing mechanism (not represented) with the result that the door 18 is able in particular to adopt an open configuration in which the leaf 19 is disengaged from the space delimited by the frame 20 and a locked configuration in which the leaf 19 is closed on the frame 20 and locked to the latter in an airtight manner to enable flight of the aircraft.

This door 18 is represented in a position mounted in the aircraft, which extends along a longitudinal axis 21. Here the aircraft door 18 is double curved about two perpendicular axes with a first curvature seen in section in FIG. 7 and a second curvature seen in section in FIG. 8.

The leaf 19 includes leaf stops 22 and the frame 20 includes frame stops 23, forming part of the locking means of the door. The stops 22, 23 are arranged so that each leaf stop 22 is positioned against a corresponding frame stop 23 when the aircraft door is in its locked configuration (which is the one represented in FIGS. 7 and 8).

Two pairs of stops can be seen in the FIG. 7 section: a first pair of stops 22, 23 on a first lateral edge 24 of the door, and a second pair of stops 22, 23 on a second lateral edge 25 of the door.

Figure 9:
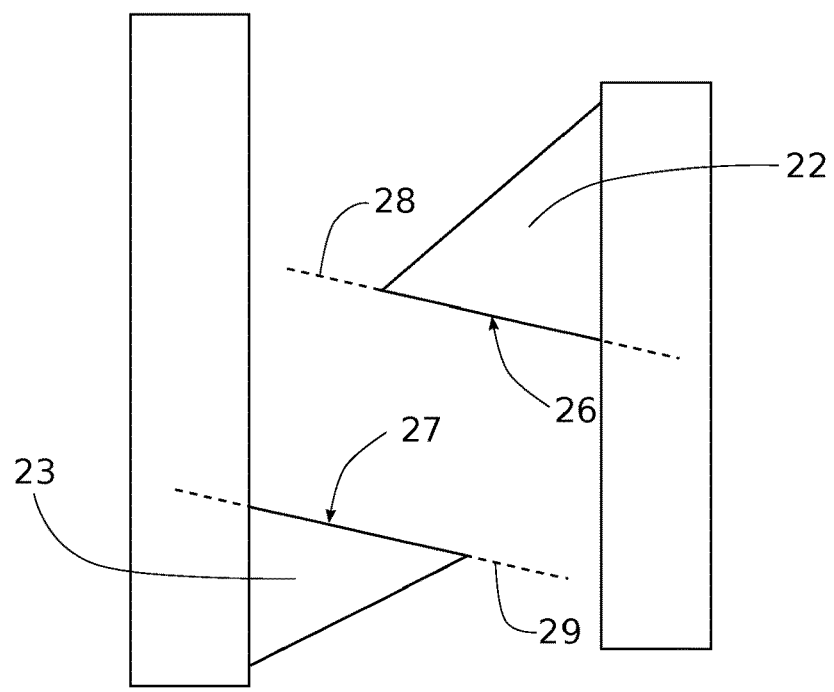
FIG. 9 illustrates a pair of stops of the locking means of the door from FIGS. 7 and 8 as a seen in section.

FIG. 9 illustrates schematically one of these pairs of stops 22, 23 as seen in section when the door is not in its locked position. Each stop 22, 23 includes a respective bearing surface 26, 27 consisting in this simplified example of a plane rectangular surface extending in a respective plane 28, 29. The bearing surfaces 26, 27 have an angular orientation determining the direction of the forces in play on contact of the stops 22, 23 of the same pair in the locked position. At the level of the body of the stops 22, 23 the planes 28, 29 therefore have the same angular orientation about an axis perpendicular to the plane of FIG. 9 when the stops 22, 23 of the same pair are in the locked position.

Moreover, the stops 22, 23 are respectively fixed to the leaf 19 and the frame 20 in an angular orientation causing them to point toward the same axis perpendicular to the plane of FIG. 8.

As an alternative, the bearing surfaces 26, 27 may have any shape adapted to produce a force the direction of which is controlled. Surfaces having a certain elasticity, or surfaces swiveling within certain limits disposed on the leaf stop or vice-versa may however be provided to guarantee optimum contact of the bearing surfaces 26, 27.

Figure 10:
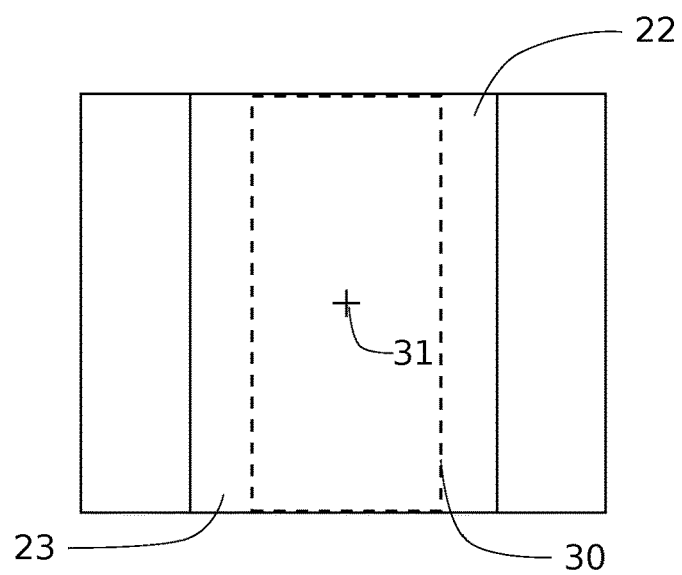
FIG. 10 represents the stops from FIG. 9 in the locked position and as seen from above.

FIG. 10 illustrates the pair of stops from FIG. 9 as seen from above relative to the FIG. 9 view when the door is in the locked configuration. The baring surface 26 is positioned against the bearing surface 27 and a contact area 30 (schematically represented in dashed outline) is delimited by the portions in contact of the bearing surfaces 26, 27. In this example the contact area 30 is a plane rectangle parallel to the plane 29.

Whatever the shape of the surfaces 26, 27, a two-dimensional or three-dimensional contact area 30 will be delimited, even for theoretical linear or point contacts, given in particular the elastic deformation of the materials on the real parts. The shape of this contact area 30 is intended to generate a contact force perpendicular to the planes 28, 29. The contact area 30 may have any other shape as a function of the contact surfaces of the stops 22, 23, for example a plane circular shape.

Accordingly, whatever the shape of the stops 22, 23, the area of contact between the two stops of the same pair of stops will delimit a contact area 30 of more or less complex shape that will include an isobarycenter 31. In the example illustrated in FIG. 10 the isobarycenter 31 is simply at the intersection of the median lines of the rectangular contact area 30.

The stops 22, 23 of the aircraft door are arranged, on the one hand, to position the isobarycenters 31 corresponding to each pair of stops 22, 23 and, on the other hand, to orient the forces the resultant of which is applied to these isobarycenters 31, in reaction to the pressure resultant on the aircraft door.

Referring to FIG. 7, the isobarycenter 31A of each contact area 30 of the first lateral edge 24 is disposed in a first plane 32 perpendicular to the longitudinal axis 21. In other words, all the isobarycenters 31A are situated in the same plane 32 which is perpendicular to the longitudinal axis 21.

The same goes for the second lateral edge 25: the isobarycenter 31B of each contact area 30 of the second lateral edge 25 is disposed in a second plane 33 perpendicular to the longitudinal axis 21. All the isobarycenters 31B are therefore situated in the same plane 33 perpendicular to the longitudinal axis 21.

Moreover, in accordance with a preferred feature, the isobarycenters 31A of the first lateral edge 24 are also disposed on a first surface 38 parallel to the exterior surface of the leaf 19. The exterior surface of the leaf 19 corresponds to the general profile of the fuselage of the aircraft and of the leaf 19 that is necessarily integrated into that profile. The surface 38 is therefore a curved surface that is at all points at a constant distance E1 from the exterior surface of the leaf 19.

In accordance with a preferred feature, the same goes for the isobarycenters 31B of the second lateral edge 25 that are moreover disposed on a second surface 39 parallel to the exterior surface of the leaf 19. The surface 39 is also a curved surface that is at every point at constant distance E2 from the exterior surface of the leaf 19.

If the feature relating to the surfaces 38 and 39 is implemented the distance E1 between the surface 38 and the exterior surface of the leaf 19 may be different from the distance E2 between the surface 39 and the exterior surface of the leaf 19, as in the example illustrated. In a variant, E1 and E2 may be equal although this is not necessary.

FIG. 8 illustrates the aircraft door 18 as seen from the side in a view showing only the stops 22, 23 of the second lateral edge 25 of the door.

To summarize:

the isobarycenter 31A of each contact area 30 of the first lateral edge 24 is disposed substantially on the line of intersection between a first plane 32 perpendicular to the longitudinal axis 21 and a first surface 38 parallel to the exterior surface of the leaf 19;

the isobarycenter 31B of each contact area 30 of the second lateral edge 25 is disposed substantially on the line of intersection between a second plane 33 perpendicular to the longitudinal axis 21 and a second surface 39 parallel to the exterior surface of the leaf 19.

Figure 11:
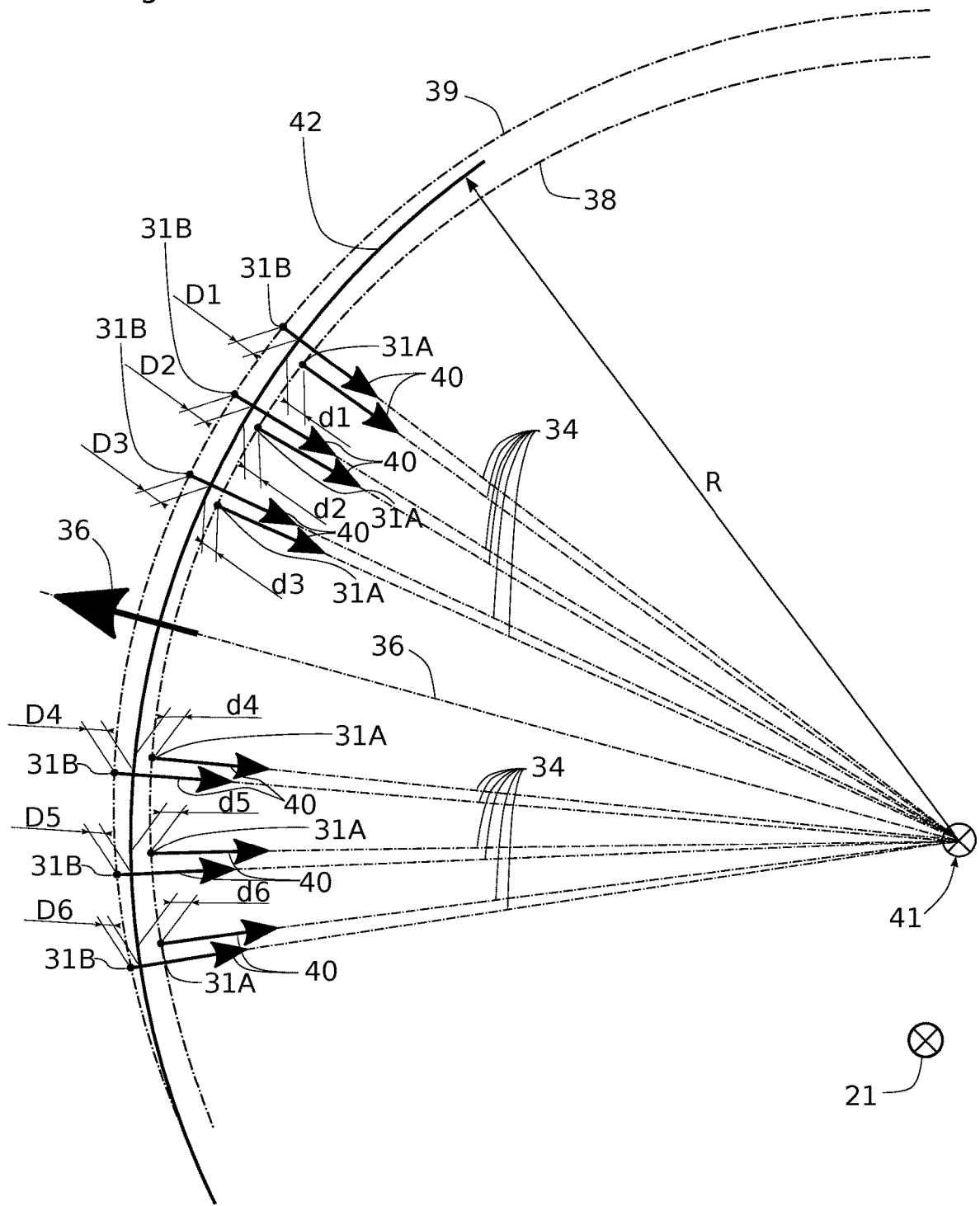
FIG. 11 is a schematic showing details of the arrangement of the stops of the door from FIGS. 7 and 8.

FIGS. 7 and 11 illustrate the arrangement enabling the required angular orientation of the bearing surfaces 26, 27 to be obtained, which orientation will condition the angular orientation of the forces exerted at the level of the stops 22, 23.

Referring to FIG. 7, for each of the contact areas 30, both for the first lateral edge 24 and for the second lateral edge 25, the normal 34 to the contact area 30 passing through its isobarycenter 31 is oriented with a deviation angle 37 relative to the corresponding plane 32 or 33. The value of the angle 37 is equal to the value of the angle 43 between the direction 36 of the vector 35 of the pressure resultant and the plane 44 perpendicular to the longitudinal axis 21.

The angle between a straight line or a vector and a plane is measured in the plane that is perpendicular to said plane and that contains the straight line or the vector.

Here the direction 36 of the pressure resultant is defined as the direction of the resultant force that is applied to the leaf 19 subjected to pressurization. This direction 36 is a function of the geometrical parameters of the door 18. The vector 35 of the pressure resultant is therefore the force that is exerted on the leaf 19 when the aircraft door 18 is mounted in an aircraft in flight and the cabin of which is pressurized, thereby creating a pressure differential between opposite sides of the leaf 19. The pressure resultant, and in particular the direction 36 of its vector 35, flows directly from the physical features of the aircraft door such as its dimensions and its various curvatures.

It is therefore possible, starting from the physical features of the aircraft door, to determine by calculation or by experiment the direction 36 of the vector 35 of the pressure resultant. During manufacture of the aircraft door the stops 22, 23 and their bearing surface 26, 27 as well as the chosen angular orientation for fixing the stops 22, 23 are then chosen so that the normal 34 to the contact area 30 passing through its isobarycenter 31 has a deviation angle 37 relative to the plane 32 equal to the angle 43 between the direction 36 of the vector 35 of the pressure resultant and the plane 44 perpendicular to the longitudinal axis 21.

In the example illustrated in which the contact area 30 is a plane rectangular area the bearing surfaces 26, 27 are oriented in parallel planes 28, 29 the normal to which forms with the corresponding plane 32, 33 an angle substantially equal to the deviation angle 37 or to that angle 37 plus 180 degrees.

The vectors 40 illustrating the reaction forces of the frame stops 23 extend along the normal 34.

FIG. 11 is a view similar to FIG. 8, not representing the stops 22, 23 but only the isobarycenters 31A and 31B both of the first lateral edge 24 and of the second lateral edge 25, projected onto this same view in two dimensions. This FIG. 11 therefore shows the profile of the disposition of all the isobarycenters 31A, 31B relative to one another in this projection.

Referring to FIG. 11, the normal 34 to each contact area 30 passing through its isobarycenter 31A, 31B passes through the axis 41 of a predetermined cylinder 42 that here is termed the "mean cylinder".

Here the mean cylinder 42 is defined as a cylinder the axis 41 of which is parallel to the longitudinal axis 21 and the radius R of which is such that the sum of the distances between each isobarycenter 31A of the first lateral edge 24 and the mean cylinder 42 is equal to the sum of the distances between the isobarycenters 31B of the second lateral edge 25 and the mean cylinder 42.

The distance between an isobarycenter 31 and the mean cylinder 42 extends as measured along a normal to the surface of the cylinder that passes through the isobarycenter 31 in question.

In the example illustrated in figure 11the aircraft door includes six pairs of stops 22, 23 on each of the lateral edges 24, 25, which corresponds to a mean cylinder 42 such that:

$$D1+D2+D3+D4+D5+D6=d1+d2+d3+d4+d5+d6$$

As before, the angular orientation of the planes 28, 29 of the stops 22, 23 is such that the normal to each contact area 30 passing through its isobarycenter 31 passes through the axis 41 of the mean cylinder 42. Consequently, all the reaction forces 40 of the frame stops 23 caused by the pressurization of the aircraft are centered on this axis 41.

In accordance with a preferred feature that further improves the distribution of the forces in the door, the mean cylinder 42 is moreover chosen so that its axis 41 and the direction 36 of the pressure resultant intersect. The position of the mean cylinder 42 therefore enables its axis 41 and the vector 35 of the pressure resultant to be situated in the same plane.

The present description therefore indicates the physical features to be used to design and to arrange the stops 22, 23 of the aircraft door 18 where the following are concerned:

the position of each pair of stops 22, 23 (by determining the position of each isobarycenter 31);

the angular orientation in all the dimensions of the bearing surfaces 26, 27 of the stops 22, 23 whether that be because of the shape of the stops 22, 23 or because of their orientation when mounted on the leaf 19 or the frame 20, respectively.

Although relative to the aircraft itself, the longitudinal axis 21 is nevertheless an intrinsic feature of the aircraft door because the latter is produced with its double curvature oriented in a predetermined manner relative to the longitudinal axis 21. Likewise, the pressure resultant is also an intrinsic feature of the aircraft door because, although its intensity varies as a function of the pressure applied to the door because of the pressurization of the cabin, its direction is constant, however, and depends only on the geometrical features of the door.

Variant embodiments may be implemented. For example, the stops 22, 23 may all have an alternative shape enabling positioning of the isobarycenters as described above.

In the embodiments described above all the stops 22, 23 are shaped and fixed so that the normal 34 to the contact areas 30 passing through their isobarycenter 31A, 31B passes substantially through the axis 41 of the mean cylinder 42. The term "substantially" indicates that the orientation of these normal 34 may nevertheless vary by a few degrees about the position corresponding exactly to the axis 41 of the mean cylinder 42. A slight variation of this angular orientation is preferably provided in a direction opposing the kinematics of the door opening mechanism. In other words, the contact areas 30 may be inclined in a direction implying said normal passing slightly above the axis 41, or inclined in a direction implying said normal 34 passing slightly above the axis 41, and this direction is chosen to create a locking slope with the effect that, when the door is pressurized, this force tends to lock the door rather than unlock it. The locking means are therefore made secure at the cost of a slight increase in the unlocking force (which is not a penalty).

In accordance with one embodiment all the contact areas 30 are oriented so that the normal 34 passes substantially through the axis 41 of the mean cylinder 42 and a set of additional stops is provided with contact areas that are more strongly oriented against the kinematics of the door opening mechanism to obtain the same type of effect as described in the preceding paragraph.

The invention claimed is:

1. A double-curved aircraft door intended for an aircraft that extends along a longitudinal axis (21), the aircraft door having at least one locked configuration and one open configuration, the aircraft door comprising:

a leaf (19) and a frame (20), the leaf (19) being articulated relative to the frame (20);

a locking device including leaf stops (22) and frame stops (23), each leaf stop (22) being positioned against a corresponding frame stop (23) when the aircraft door is in a locked configuration, each leaf stop (22) and the corresponding frame stop (23) forming a pair of complementary stops that include bearing surfaces (26, 27) that are in contact in an area of contact (30) when the aircraft door is in the locked configuration, said pairs of complementary stops being arranged on a first lateral edge (24) and on a second lateral edge (25) of the aircraft door, the corresponding areas of contact (30) being arranged in at least two sets: a first set of contact areas of the first lateral edge and a second set of contact areas of the second lateral edge;

the isobarycenter (31A) of each contact area (30) of the first lateral edge (24) is disposed in a first plane (32) perpendicular to said longitudinal axis (21);

the isobarycenter (31B) of each contact area (30) of the second lateral edge (25) is disposed in a second plane (33) perpendicular to said longitudinal axis (21);

for each contact area (30) the normal (34) to the contact area (30) passing through its isobarycenter (31A, 31B) passes substantially through the axis (41) of the mean cylinder (42), the mean cylinder (42) being defined as the circular base cylinder the axis (41) of which is parallel to said longitudinal axis (21) and the radius (R) of which satisfies the following condition: the sum of the distances (D1,D2,D3,D4,D5,D6) between the isobarycenter (31A) of each contact area (30) of the first lateral edge (24) and the mean cylinder (42) is substantially equal to the sum of the distances (d1,d2,d3, d4,d5,d6) between the isobarycenter (31B) of each contact area (30) of the second lateral edge (25) and the mean cylinder (42);

for each contact area (30) the normal (34) to the contact area (30) passing through its isobarycenter (31A, 31B) forms a deviation angle (37) with a plane (32, 33) perpendicular to said longitudinal axis (21), the deviation angles (37) of all the contact areas (30) being equal.

2. The aircraft door as claimed in claim 1, wherein the isobarycenter (31A) of each contact area (30) of the first lateral edge (24) is also disposed on a first surface (38) parallel to the exterior surface of the leaf (19).

3. The aircraft door as claimed in claim 2, wherein the isobarycenter (31B) of each contact area (30) of the second lateral edge (25) is also disposed on a second surface (39) parallel to the exterior surface of the leaf (19).

4. The aircraft door as claimed in claim 1, wherein the axis (41) of the mean cylinder and the pressure resultant direction

(36) intersect, the pressure resultant direction (36) being defined as the direction of the resultant force (35) applied to the leaf (19) of the aircraft door when it is subjected to a pressure.

5. The aircraft door as claimed in claim 1, wherein the deviation angle (37) is equal to the angle (43) formed between the pressure resultant direction (36) and a plane (44) perpendicular to said longitudinal axis (21), the pressure resultant direction (36) being defined as the direction of the resultant force (35) applied to the leaf (19) of the aircraft door when it is subjected to a pressure.

6. The aircraft door as claimed in claim 1, wherein the frame stops (23) of the first lateral edge (24) are identical.

7. The aircraft door as claimed in claim 1, wherein the frame stops (23) of the second lateral edge (25) are identical.

8. The aircraft door as claimed in claim 1, wherein the leaf stops (22) of the first lateral edge (24) are identical.

9. The aircraft door as claimed in claim 1, wherein the leaf stops (22) of the second lateral edge (25) are identical.

10. The aircraft door as claimed in claim 1, wherein the contact areas (30) extend in a contact plane (28, 29) oriented angularly on the corresponding stop (22, 23) in at least one direction.

11. The aircraft door as claimed in claim 10, wherein the contact areas (30) have a plane rectangular or plane circular shape.

12. The aircraft door as claimed in claim 2, wherein the first surface (38) parallel to the exterior surface of the leaf (19) is spaced by a constant first distance (E1) from the exterior surface of the leaf (19).

13. The aircraft door as claimed in claim 12, wherein the second surface (39) parallel to the exterior surface of the leaf (19) is spaced by a constant second distance (E2) from the exterior surface of the leaf (19).

14. The aircraft door as claimed in claim 13, wherein the first constant distance (E1) and the second constant distance (E2) are different.

15. The aircraft door as claimed in claim 13, wherein the first constant distance (E1) and the second constant distance (E2) are equal.

16. The aircraft door as claimed in claim 1, further including an opening mechanism and a supplementary set of stops defining contact areas the normal to which passing through their isobarycenter is at a distance from the axis (41) of the mean cylinder (42) on a side corresponding to opposition to the kinematic of the opening mechanism.

* * * * *